Aug. 29, 1944.　　　R. R. ROOT　　　2,356,950
DUSTING AND SPRAYING APPARATUS
Filed Aug. 6, 1941　　　4 Sheets-Sheet 2

INVENTOR.
RALPH R. ROOT
BY
Kwis Hudson & Kent
ATTORNEYS

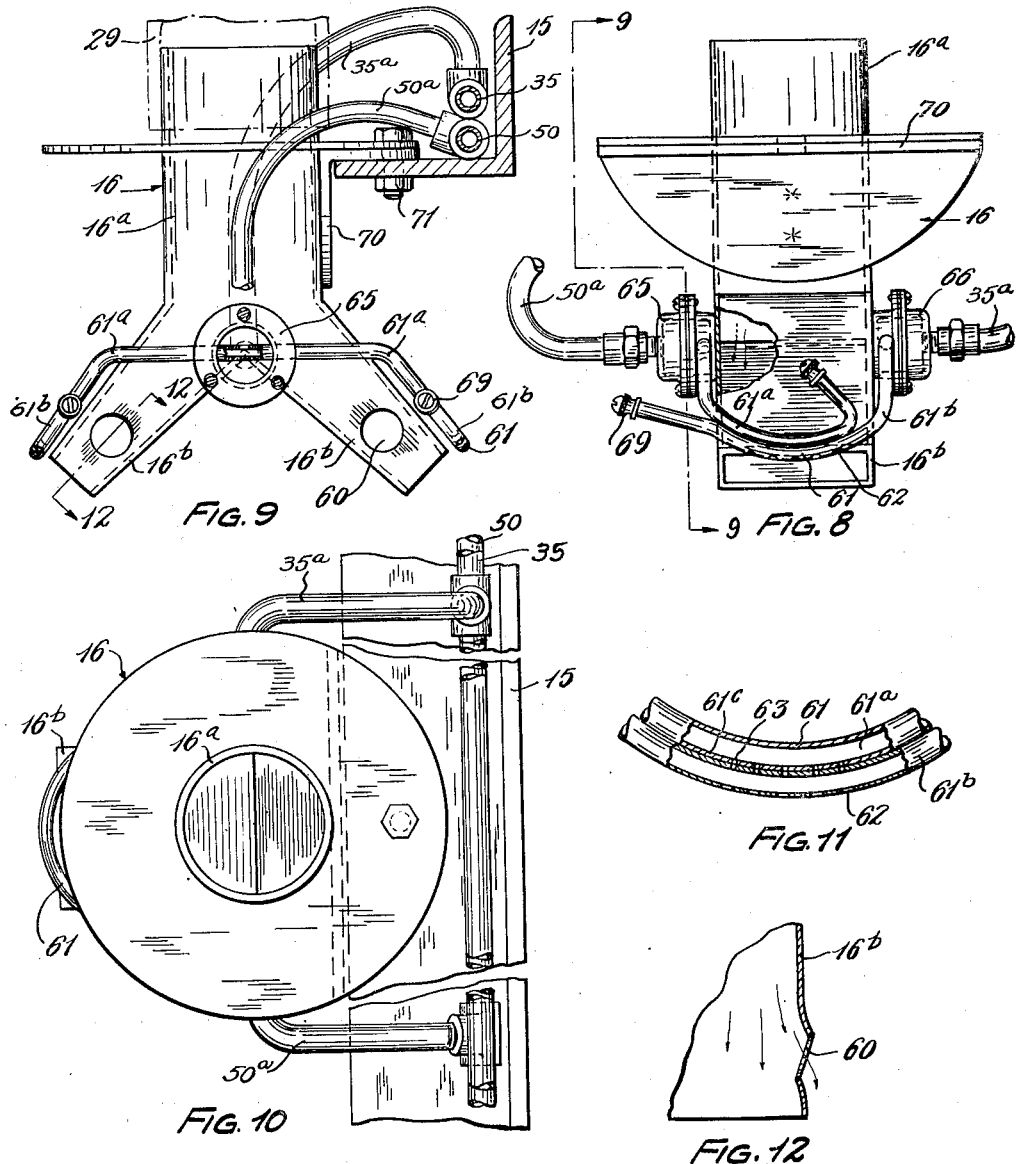

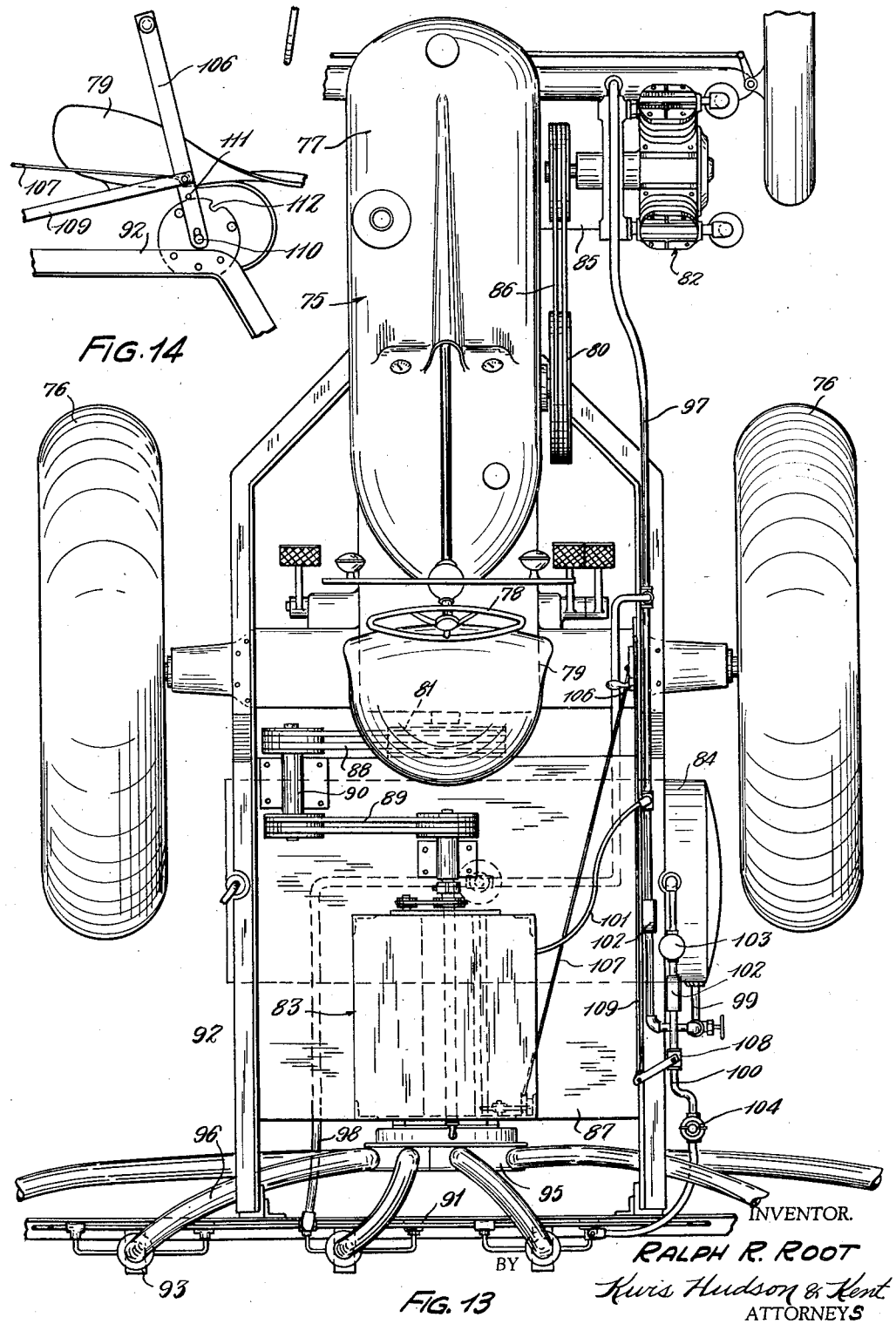

Patented Aug. 29, 1944

2,356,950

UNITED STATES PATENT OFFICE 2,356,950

DUSTING AND SPRAYING APPARATUS

Ralph R. Root, Lakewood, Ohio, assignor to The Root Manufacturing Company, Cleveland, Ohio, a corporation of Ohio Application August 6, 1941, Serial No. 405,666

5 Claims. (Cl. 43—148)

This invention relates to the treating of vegetation with insecticide and fungicide materials and more particularly to novel apparatus with which a combined spraying and dusting of the vegetation can be effected.

My invention also aims to provide improved plant-treating apparatus embodying means for producing a stream of dust-laden air and directing the same toward the vegetation and also embodying means for atomizing a suitable liquid which will cause the dust to adhere to the vegetation and which may also have desirable plant-treating characteristics.

Another object of my invention is to provide improved apparatus of this kind adapted to travel over or through the vegetation and embodying efficient means by which the dust and liquid can be atomized and directed toward the vegetation.

Still another object of my invention is to provide improved apparatus of this kind embodying a novel form of a dust-distributing and liquid-atomizing nozzle.

A further object of my invention is to provide improved dusting apparatus in which novel means is employed for agitating the supply of dust contained in the hopper.

The invention may be further briefly summarized as consisting in certain novel combinations and arrangements of parts hereinafter described and particularly set out in the appended claims.

In the accompanying sheets of drawings,

Fig. 3 is a partial vertical sectional view taken through the apparatus as indicated by line 3—3 of Fig. 1;

Fig. 8 is an end elevation showing my novel dust-distributing and liquid-atomizing nozzle with portions thereof broken away;

Fig. 9 is a side elevation of the nozzle, viewed as indicated by line 9—9 of Fig. 8, with certain adjacent structure shown in section;

Fig. 10 is a plan view of the nozzle and adjacent structure;

Fig. 11 is a detail view partly in section showing the liquid-atomizing means;

Fig. 12 is a partial sectional view taken through one of the dust-distributing outlets as indicated by line 12—12 of Fig. 9;

Fig. 13 is a plan view showing my combined dusting and spraying apparatus mounted on a tractor; and Fig. 14 is a partial side elevation showing a control adjacent the driver's seat for controlling the dusting and spraying apparatus.

More detailed reference will now be made to the drawings for the purpose of describing the construction and operation of my improved plant-treating apparatus, but it will be understood, of course, that the invention is not to be regarded as limited to the particular forms of the apparatus herein illustrated inasmuch as the invention may be embodied in various other similar devices and arrangements.

Figure 1:
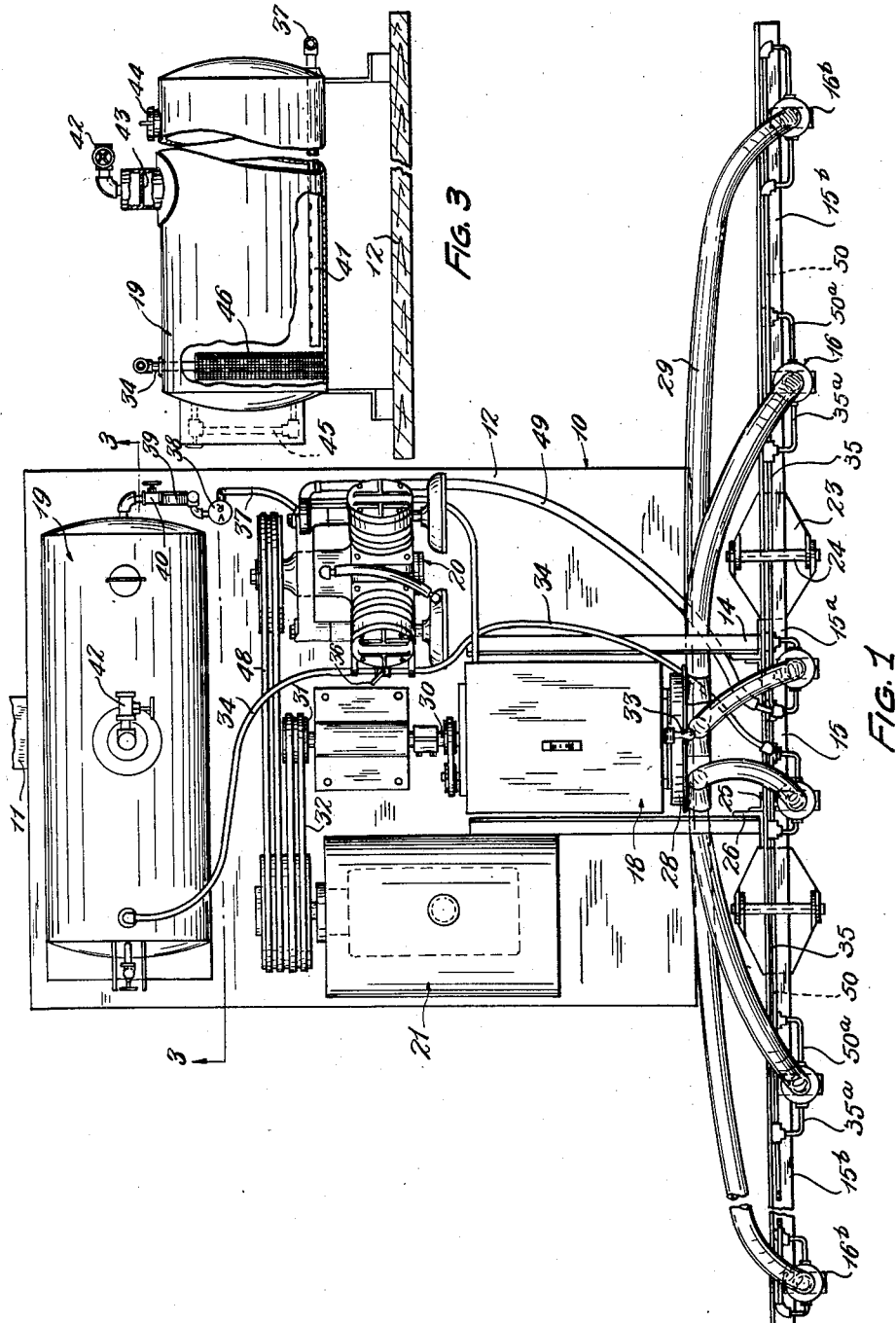
Fig. 1 is a plan view of one form of the combined dusting and spraying apparatus of my invention and showing the same mounted on a trailer.
Figure 2:
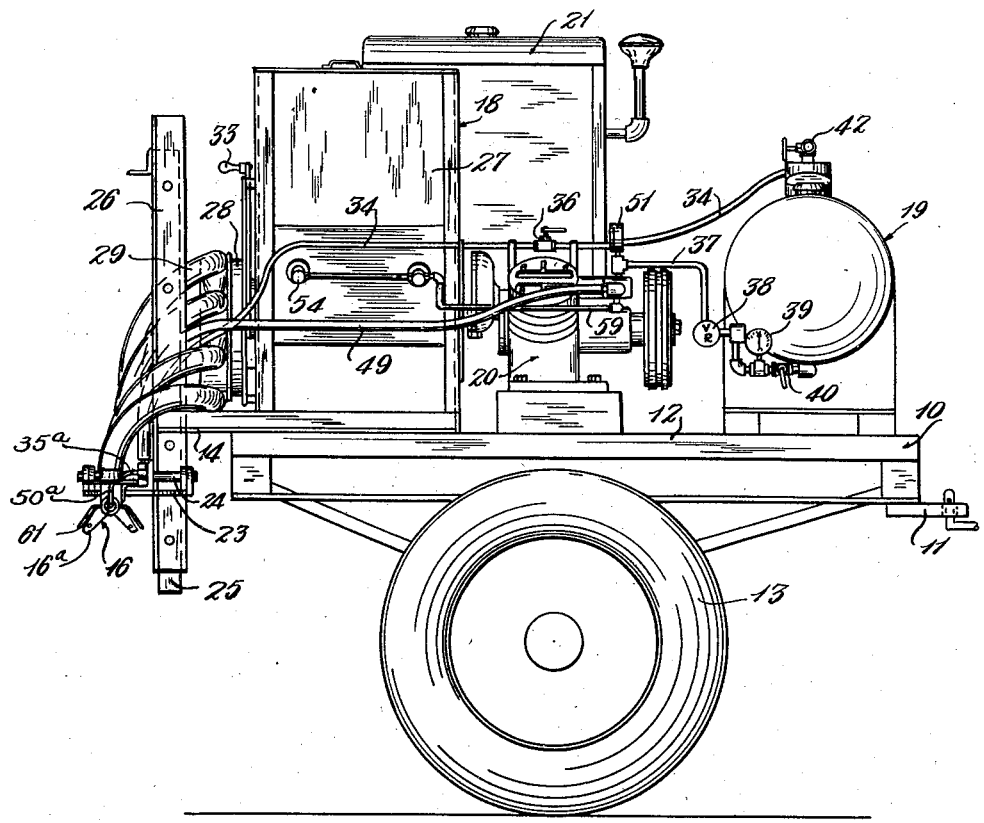
Fig. 2 is a side elevation thereof.
Figure 6:
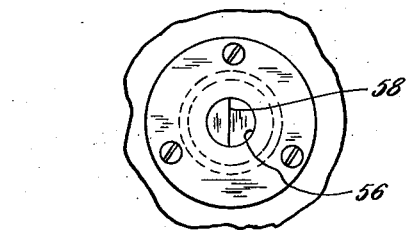
Fig. 6 is a detached plan view of the agitating means.
Figure 4:
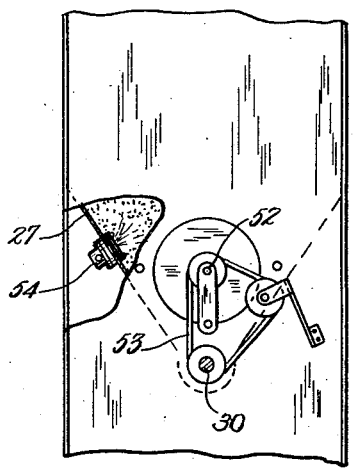
Fig. 4 is a partial end elevation of the dust-feeding apparatus with portions broken away to show the agitating means.
Figure 5:
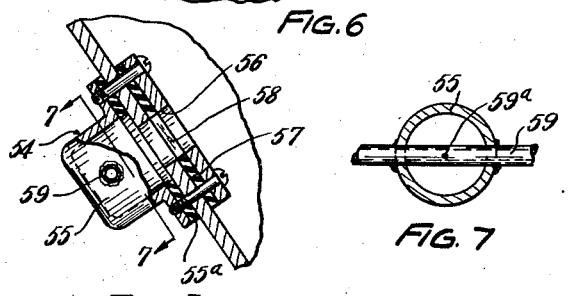
Fig. 5 is a detached view on a larger scale and partly in section further illustrating the dust-agitating means.
Figure 7:
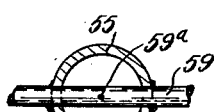
Fig. 7 is a transverse sectional view taken through the agitating means as indicated by line 7—7 of Fig. 5.

In the present embodiment of the invention I show dusting and spraying apparatus which, as shown in Figs. 1 and 2, may be mounted on a trailer unit 10 adapted to be connected with a power-driven vehicle by a hitch 11, or may be mounted directly on a power-driven vehicle or tractor as shown in Fig. 14. The trailer unit shown in Figs. 1 and 2 may comprise a platform or base 12 which is suitably mounted on a pair of wheels 13 and on which the various parts of the apparatus may be supported. The rear end of the unit 10 may have a projecting or overhanging frame 14 supporting a sectional boom 15 which carries a plurality of spaced liquid-atomizing and dust-distributing nozzles 16. The apparatus carried by the unit 10 may also include a dust feeding and atomizing device 18, a liquid-containing tank 19, and an air compressor 20. The dust feeding and atomizing device and the compressor can be driven from the motor of the power-driven vehicle, or when the apparatus is arranged on a trailer unit as shown in Figs. 1 and 2, an internal combustion engine 21 may be used to drive the dust feeding device and the compressor.

The boom 15 which carries the nozzles 16 may comprise an intermediate section 15a connected with the frame 14 and a pair of end sections 15b having their adjacent or inner ends hinged to the intermediate section so that they can be swung upwardly whenever this is desirable to prevent interference with buildings, fences, or the like. The hinge connections between the sections 15a and 15b may be formed by suitable hinge plates 23 mounted on the sections and connected with each other by a hinge pin 24. The intermediate section 15a may be provided with upright members 25 which are slidable between guide members 26 carried by or forming a part of the frame 14 so that the boom can be adjusted upwardly or downwardly with respect to the ground. The apparatus shown in this instance is intended mainly for the treatment of ground crops, and the nozzles 16 are therefore mounted on the boom 15 in laterally spaced relation so that they will direct the dust-laden air and atomized liquid downwardly toward the plants being treated.

The dust feeding and atomizing device 18 may be of any suitable type or construction and may comprise a hopper 27 adapted to contain a supply of dust and a blower 28 adapted to create a blast of air into which the dust is fed from the hopper. The blower delivers a plurality of streams of the dust-laden air through conduits 29 leading to the individual nozzles 16. The blower 28 may have a forwardly extending drive shaft 30 with a pulley 31 thereon, and may be driven from the engine 21 by a belt 32 extending around such pulley. An operator riding on the trailer unit may control or regulate the feeding of the dust from the hopper 27 into the blast of air by suitable control means actuated by the hand lever 33.

The tank 19 may contain a supply of oil or other suitable plant-treating liquid or solution which is supplied to the nozzles 16 through the piping 34 extending from the tank to the intermediate section 15a of the boom and through branch piping 35 extending outwardly along the boom sections 15b and having connections 35a to the individual nozzles. The feeding of the liquid from the tank 19 to the nozzles may be controlled by the operator by means of a valve 36 located in the piping 34.

The liquid may be forced out of the tank 19 by any suitable means, but is preferably discharged from the tank by introducing compressed air thereinto through piping 37 connecting the tank with the compressor 20. The piping 37 may have a pressure-reducing valve 38 therein which is set so that only a relatively low pressure will be maintained in the tank. This piping may also include a pressure gauge 39 and a control valve 40. The piping 37 communicates with the interior of the tank 19 through a perforated pipe 41 extending longitudinally within the tank adjacent the bottom thereof. The air entering the tank through the piping 37 will be discharged upwardly through the liquid in a plurality of streams, and this will serve as an agitating means for the liquid. From time to time the operator may open or partially open a valve 42 provided at the top of the tank, thus permitting some of the air to escape from the tank so that additional air will enter through the piping 37 and the perforated pipe 41 to agitate the liquid. A perforated baffle plate 43 may be arranged in the passage leading to the valve 42 to prevent liquid from being carried out of the tank with the escaping air.

In addition to the connections just mentioned above, the tank may also have a suitable filling opening 44 and a gauge glass 45 by which the height of the liquid in the tank may be observed. The delivery pipe 34 may extend into the tank to a point adjacent the bottom thereof as shown in Fig. 3, and may be surrounded by an elongated strainer 46.

The air compressor 20 may be driven from the engine 21 by a suitable belt 48 and in addition to supplying air to the tank 19, it also supplies air to the nozzles 16 for atomizing the liquid. The compressor may be connected with the nozzles 16 by a pipe 49 extending to the intermediate section 15a of the boom and through branch pipes 50 extending outwardly on the boom sections 15b and connections 50a leading to the individual nozzles. A pressure gauge 51 may be mounted on the compressor or in the piping leading therefrom and may be arranged so that it can be readily observed by the operator.

To facilitate the feeding of dust from the hopper 27, it is desirable to agitate the dust to prevent the same from sticking to the walls of the hopper. A suitable mechanical agitating means 52 is usually provided in these hoppers and is arranged to be driven from the blower shaft 30 by a belt 53. In the present arrangement I use one or more air blasts in addition to such mechanical agitating means. The air blasts may be delivered into the hopper by nozzles or discharge devices 54 mounted on the wall of the hopper.

The air blast device 54 may comprise a cup-like member 55 secured against the outer face of the hopper 27, with a gasket 55a therebetween, so that the cup-like member surrounds an opening 56 formed through the hopper wall. A sheet or disk 57 of resilient material, such as rubber, may be clamped against the hopper wall so as to extend across the opening 56. This sheet or disk has a slit 58 therein through which air is blown from the cup member 55 into the mass of dust contained in the hopper. The resiliency of the rubber sheet permits the slit 58 to open sufficiently for the air stream to be directed into the mass of dust and causes it to be automatically closed against the escape of dust when the air stream is shut off. In the apparatus here illustrated, I show two of the air-blast devices 54 on the hopper 27, although any desired number of such devices may be used. The air for agitation of the dust may be supplied from the compressor 20 through suitable piping 59 which extends into the cup members 55 and has very small discharge holes 59a therein.

The nozzles 16 constitute an important part of my dusting and spraying apparatus, and these will be described next. As best shown in Figs. 8, 9, and 10, the nozzles 16 comprise a hollow body having a tubular portion 16a with which one of the conduits 29 leading from the blower 28 may be connected, and a pair of diverging tubular outlets or spouts 16b which direct the dust-laden air toward the vegetation. The provision of the two outlets 16b on each nozzle in divergent or inverted-Y arrangement is an important feature in obtaining a desired distribution of the dust, as will be later explained. The outlets 16b may be of any suitable size or shape and, as shown in this instance, may be rectangular in form and may be somewhat tapered. Each of the outlets 16b has a main discharge opening in the end thereof, and in addition thereto, may have auxiliary openings 60 in one or more of their side walls. The wall portions adjacent the openings 60 may be bent or deflected as shown in Fig. 12 so that some of the dust-laden air will be discharged through these auxiliary openings to increase the range or coverage area of the nozzles.

In addition to directing the dust-laden air toward the vegetation, the nozzles 16 also serve to atomize the liquid being supplied from the tank 19, as mentioned above. For this purpose I provide a liquid-atomizing means 61 adjacent each of the dust outlets 16b and these atomizing means or devices are also disposed in what may be called a divergent or inverted-Y arrangement. This atomizing means may comprise a liquid passage or tube 61b and an air passage or tube 61a arranged to extend side by side so as to have a common wall or separating partition 61c therebetween. The liquid tube or passage 61b has a plurality of longitudinally spaced openings 62 therein, and the common wall or partition 61c has a plurality of relatively smaller openings 63 formed therein and spaced therealong so that they will lie substantially opposite the openings 62. The compressed air supplied to the tubes or passages 61a is directed by the openings 63 across the liquid tube or passage 61b and out through the openings 62 of the latter. These air streams pick up or entrain liquid from the tube or passage 61b, and carry the same out into the atmosphere, and at the same time, atomize the liquid and direct or distribute the same into the streams or clouds of dust-laden air being discharged by the outlets 16b.

As shown in Fig. 9, a pair of the air and liquid tubes 61a and 61b forming the liquid-atomizing means 61 is located just above the discharge opening of each of the outlets 16b, and, as shown in Fig. 8, the portions of these tubes forming the atomizing means may be soldered or otherwise connected together and may be curved or bent to a bowed or arcuate shape so as to obtain a desired distribution or direction of discharge for the atomized liquid. The two air tubes 61a of the nozzle 16 may be connected with a small chamber 65 mounted on one side of the nozzle, and similarly, the two liquid tubes 61b may be connected with a small chamber 66 on the opposite side of the nozzle. The chamber 65 may be connected with the air supply pipe 50 by the connection 50a and the chamber 66 may be connected with the liquid supply pipe 35 by means of the connection 35a. The outer ends of the air and liquid tubes 61a and 61b may be closed by screw plugs 69 which can be removed whenever desired to permit the tubes to be blown out for cleaning purposes.

The nozzles 16 may be mounted on the boom 15 or on any other desired support by any appropriate connecting means. In this instance, I show each nozzle provided with an angular mounting bracket or clip 70 which can be conveniently connected to the boom or other support by a bolt 71. It will be noted that the nozzles 16 are mounted on the boom 15 so that the diverging dust outlets 16b and the divergently disposed atomizing means 61 extends in a longitudinal or fore-and-aft direction with respect to the direction of travel of the unit 10. This is a very important feature of my apparatus because it results in a more thorough application of the dust and spray to the various parts and surfaces of the plants. As the unit 10 travels forward and the nozzles 16 approach the plants, the leading dust outlet 16b and atomizing device 61 of each nozzle discharge their streams of dust and spray in an inclined downwardly and forwardly extending direction which causes the dust and spray to strike the underneath portions of the plants and foliage as well as their upper portions and particularly on the sides of the plants from which the nozzles are approaching. As the nozzles move away from the plants, the trailing dust outlets 16b and atomizing devices 61 discharge similar inclined streams of dust and spray downwardly and backwardly against the plants from the side opposite to that mentioned above and again the dust and spray strike the underneath portions of the plants as well as their upper portions.

In treating vegetation with my improved apparatus the dust and liquid are atomized separately by the devices 18 and 61 but the dust-laden air discharged from the nozzle outlets 16b and the atomized liquid become thoroughly mingled in streams or clouds which are directed toward the vegetation with considerable velocity causing the mixture to reach and impinge against substantially all parts and surfaces of the vegetation. The atomized liquid forms a light or thin film or coating on the plant surfaces which causes the dust particles to adhere firmly.

In Fig. 13 I show my combined dusting and spraying apparatus mounted directly on a power-driven vehicle or tractor 75. The tractor may be of a well known construction having propelling wheels 76 connected with the driving engine 77 and having a driver's seat or station 79 with various vehicle controls adjacent thereto, including a steering wheel 78. The tractor may also have a plurality of power take-off connections or pulleys 80 and 81 thereon.

My dusting and spraying apparatus as applied to the tractor 75 is similar to the apparatus shown in Figs. 1 and 2 and includes an air compressor 82, a dust-atomizing device 83, and a tank 84 adapted to contain a quantity of the oil or other liquid to be atomized. The air compressor may be mounted on a suitable bracket 85 and may be driven from the power take-off pulley 80 by the belt 86. The dust-atomizing device 83 may be mounted on a platform or shelf 87 and may be driven from the power take-off pulley 81 by means of the belts 88 and 89 and the counter-shaft 90. The tank 84 may be suitably supported beneath the platform or shelf 87. In addition to the units already mentioned, this form of my combined spraying and dusting apparatus also includes a transverse boom 91 suitably supported at the rear of the tractor by an auxiliary frame 92 and carrying a plurality of laterally spaced liquid-atomizing and dust-distributing nozzles 93 which are substantially identical with the nozzles 16 of Figs. 1, 2, and 9.

The dust-atomizing device 83 is similar to the dust atomizer 18 and includes a blower 95 having a plurality of flexible conduits 96 extending therefrom to the respective nozzles 93 for supplying dust-laden air to the latter. The compressor 82 supplies liquid-atomizing air to the nozzles 93 through the pipes 97 and 98. Air is also supplied by the compressor to the tank 84 through the pipe connection 99 for agitating the liquid in the tank and also for creating a pressure within the tank to force liquid therefrom through the piping 100 to the nozzles 93. The compressor may also supply air to the dust atomizer 83 through a pipe connection 101 for agitating the dust in the hopper of this device by means of one or more air blast devices such as the device 54 above described. The piping connected with the tank 84 may also include pressure gauges 102 located on the air and liquid lines 97 and 100, a pressure-reducing valve 103, and a strainer unit 104.

For controlling the operation of this modified form of my combined spraying and dusting apparatus, I provide a control lever 106 adjacent the driver's seat 79 for controlling both the delivery of atomized dust by the device 83 and the delivery of liquid from the tank 84 to the nozzles 93. The lever 106 is conveniently accessible to the driver and can be manipulated by him while driving the tractor. The lever 106 is connected with a control or actuating member of the dust-atomizing device 83 by means of a link 107 and is also connected with a control valve 108 located in the piping 100 by means of a link 109. As shown in Fig. 14, the lever 106 has a pivotal mounting 110, and when swung in a forward direction to engage the pin 111 in the slot 112, a pulling force will be applied to both of the links 107 and 109 to cause atomized dust and liquid to be supplied to the nozzles 93.

Since the nozzles 93 are substantially identical in construction and purpose with the nozzles 16 above described, no further explanation is needed in connection therewith.

From the foregoing description and the accompanying drawings it will now be readily seen that I have provided improved dusting and spraying apparatus with which dust-laden air and atomized liquid can be rapidly and efficiently applied to growing vegetation in a manner such that the dust and spray will reach the underneath portions of the plants as well as their upper portions and such that the atomized liquid will be thoroughly mixed with the dust-laden air and will cause the dust to adhere firmly to the vegetation.

While I have illustrated and described my improved dusting and spraying apparatus in a more or less detailed manner, it will be understood, of course, that I do not wish to be limited to the particular apparatus herein disclosed but regard my invention as including such changes and modifications as do not constitute a departure from the spirit of the invention and the scope of the appended claims.

Having thus described my invention, I claim:

1. In apparatus of the character described, a vehicle having thereon means for producing a stream of dust-laden air, a nozzle having downwardly diverging spouts for discharging the dust-laden air, liquid atomizing devices arranged adjacent said diverging spouts so as to direct atomized liquid into the dust-laden air, and means for supplying liquid to said atomizing devices, said nozzle being mounted on the vehicle with one of its diverging spouts extending downwardly and forwardly and the other extending downwardly and rearwardly so as to direct an inclined stream of the dust-laden air downwardly and forwardly toward plants being approached by the nozzle, and a second inclined stream downwardly and rearwardly toward the same plants as the nozzle moves away.

2. In apparatus of the character described, a nozzle for discharging dust-laden air, and a liquid-atomizing device arranged to direct atomized liquid into the dust-laden air discharged by said nozzle, said atomizing device having coextending air and liquid supply passages separated by an intervening wall, the liquid supply passage having a plurality of discharge openings spaced therealong and the air supply passage having a plurality of openings arranged to discharge air across the liquid supply passage and through the spaced openings of the latter.

3. In apparatus of the character described, a nozzle having a laterally elongated opening for discharging dust-laden air, and a liquid-atomizing device extending along one side of said opening, said atomizing device comprising air and liquid supply tubes having a common wall therebetween, the liquid supply tube having a row of discharge openings spaced therealong and said common wall having a row of openings arranged to discharge air across the liquid supply tube and through the first-mentioned row of openings.

4. In apparatus of the character described, a nozzle having a laterally elongated opening for discharging dust-laden air, and a liquid-atomizing device extending along one side of said opening, said atomizing device comprising air and liquid supply tubes having a common wall therebetween, the liquid supply tube having a row of discharge openings spaced therealong and said common wall having a row of relatively smaller openings arranged to discharge air across the liquid supply tube and through the first-mentioned row of openings.

5. In apparatus for treating plants, a vehicle, a plurality of nozzles on said vehicle each comprising a pair of divergent outlets for atomized dust and a pair of divergently disposed liquid-atomizing devices, means for supplying atomized dust to said outlets, and means for supplying air and liquid under pressure to said liquid-atomizing devices, said nozzles being mounted with the divergent outlets and atomizing devices extending forwardly and rearwardly so as to direct intimately mixed atomized dust and atomized liquid in an inclined direction toward the plants as they are being approached by the nozzles and again toward the same plants as the nozzles move therefrom.

RALPH R. ROOT.